US012586812B2

(12) United States Patent
Isono et al.

(10) Patent No.: US 12,586,812 B2
(45) Date of Patent: Mar. 24, 2026

(54) METHOD FOR PRODUCING ALL SOLID-STATE BATTERY, AND ALL SOLID-STATE BATTERY

(71) Applicant: TOYOTA JIDOSHA KABUSHIKI KAISHA, Toyota (JP)

(72) Inventors: Motoshi Isono, Toyota (JP); Norihiro Ose, Sunto-gun (JP); Tomoya Suzuki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 802 days.

(21) Appl. No.: 17/561,318

(22) Filed: Dec. 23, 2021

(65) Prior Publication Data

US 2022/0115691 A1 Apr. 14, 2022

Related U.S. Application Data

(62) Division of application No. 16/567,149, filed on Sep. 11, 2019, now abandoned.

(30) Foreign Application Priority Data

Sep. 21, 2018 (JP) ................................. 2018-177884

(51) Int. Cl.
H01M 4/13 (2010.01)
H01M 4/139 (2010.01)
(Continued)

(52) U.S. Cl.
CPC ..... H01M 10/0562 (2013.01); H01M 10/052 (2013.01); H01M 10/0585 (2013.01); *H01M 2300/0068* (2013.01)

(58) Field of Classification Search
CPC ..... H01M 10/0565; H01M 2300/0065; H01M 2300/0085; H01M 4/13; H01M 4/36; (Continued)

(56) References Cited

U.S. PATENT DOCUMENTS

2010/0124694 A1 5/2010 Hikata et al.
2010/0209763 A1 8/2010 Okamura et al.
(Continued)

FOREIGN PATENT DOCUMENTS

JP 2009238587 A 10/2009
JP 2011-040282 A 2/2011
(Continued)

OTHER PUBLICATIONS

Communication dated Apr. 12, 2022 from the U.S. Patent and Trademark Office in U.S. Appl. No. 16/657,149.
(Continued)

*Primary Examiner* — Allison Bourke
*Assistant Examiner* — Charlene Bermudez
(74) *Attorney, Agent, or Firm* — Sughrue Mion, PLLC

(57) ABSTRACT

It is suppressed that an active material particle enters into or penetrates through a solid electrolyte layer when an active material layer and the solid electrolyte layer are pressed and that short circuits between a cathode and an anode occur. A method for producing an all solid-state battery includes: a first step of stacking an active material layer over at least one surface of a solid electrolyte layer to constitute a stack; and a second step of pressing the stack to constitute a compact, wherein in the first step, the active material layer contains a secondary particle of an active material, and in the second step, the secondary particle is crushed to primary particles by said pressing, the secondary particle being present in an interfacial portion between the active material layer and the solid electrolyte layer.

2 Claims, 8 Drawing Sheets

(51) Int. Cl.
  *H01M 10/052* (2010.01)
  *H01M 10/0562* (2010.01)
  *H01M 10/0585* (2010.01)
(58) Field of Classification Search
  CPC ....... H01M 2004/021; H01M 10/0561; H01M 10/0562; H01M 2300/0068; H01M 4/139; H01M 10/0427; H01M 10/0585; H01M 10/0587; H01M 2004/028
  See application file for complete search history.

(56) References Cited

U.S. PATENT DOCUMENTS

| | | | |
|---|---|---|---|
| 2011/0281173 | A1 | 11/2011 | Singh et al. |
| 2015/0333362 | A1 | 11/2015 | Sato et al. |
| 2016/0380266 | A1 | 12/2016 | Suzuki et al. |
| 2018/0226652 | A1* | 8/2018 | Mori ..................... H01M 4/668 |
| 2019/0221833 | A1 | 7/2019 | Shimokawa |
| 2021/0083252 | A1 | 3/2021 | Fujiki |
| 2021/0367265 | A1* | 11/2021 | Sugiyo ............. H01M 10/0562 |

FOREIGN PATENT DOCUMENTS

| | | | |
|---|---|---|---|
| JP | 2011-192606 | A | 9/2011 |
| JP | 2012-099225 | A | 5/2012 |
| JP | 2014-35818 | A | 2/2014 |
| JP | 2014-116149 | A | 6/2014 |
| JP | 2014-127463 | A | 7/2014 |
| JP | 2016-1598 | A | 1/2016 |
| JP | 2017-59534 | A | 3/2017 |
| WO | 2015/045719 | A1 | 4/2015 |
| WO | 2017/006591 | A1 | 1/2017 |

OTHER PUBLICATIONS

Communication dated Oct. 21, 2025 issued by the United States Patent and Trademark Office in U.S. Appl. No. 18/584,473.
Communication dated May 14, 2025 in U.S. Appl. No. 18/584,473.

* cited by examiner

Fig. 2A
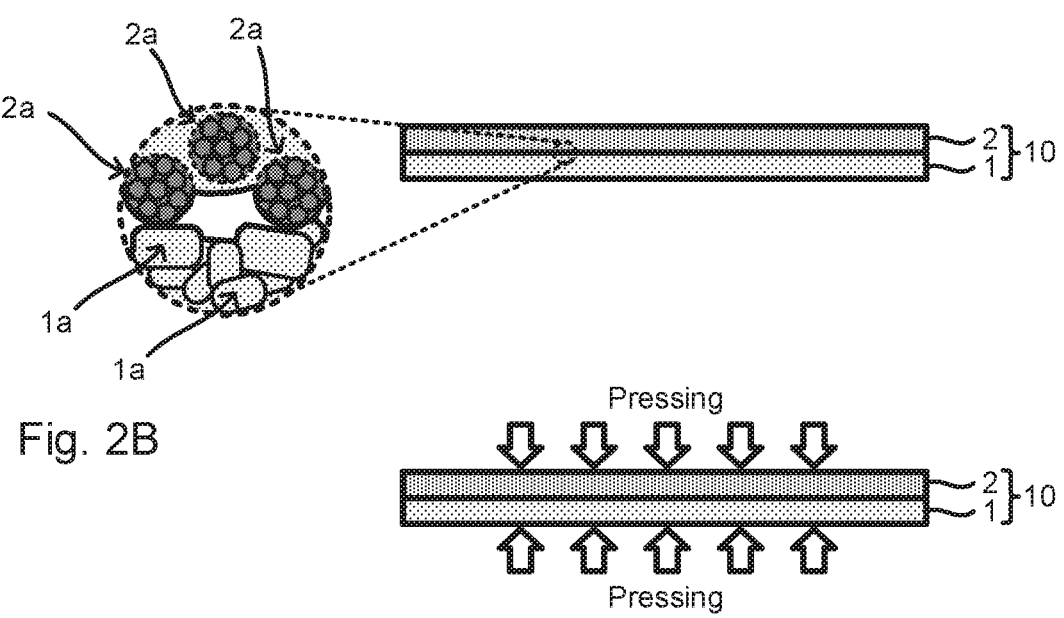
Fig. 2B
Fig. 2C
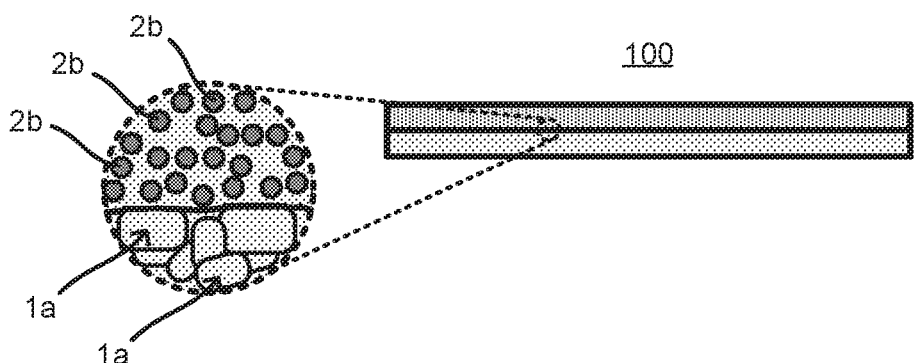

Extending part      Opposing part      Extending part

METHOD FOR PRODUCING ALL SOLID-STATE BATTERY, AND ALL SOLID-STATE BATTERY

FIELD

The present application discloses, for example, a method for producing an all solid-state battery.

BACKGROUND

An all solid-state battery includes a cathode active material layer, an anode active material layer, and a solid electrolyte layer that is arranged between the cathode active material layer and the anode active material layer. The active material layers and the solid electrolyte layer of the all solid-state battery are mainly composed of a solid particle. Containing a secondary particle of an active material in an active material layer of the all solid-state battery as disclosed in Patent Literatures 1 and 2 makes it expectable to reduce the interfacial resistance during charging/discharging of the all solid-state battery, to improve a discharge capacity thereby, to improve the rate characteristics and cycle characteristics, and so on.

CITATION LIST

Patent Literature

Patent Literature 1: JP 2014-116149 A
Patent Literature 2: JP 2011-040282 A

SUMMARY

Technical Problem

A stack may be pressed after an active material layer and the solid electrolyte layer are stacked to constitute the stack when the all solid-state battery is produced for the purpose of suitably unifying solid particles that the active material layer and the solid electrolyte layer are composed of, to achieve reduction of the interfacial resistance. In contrast, according to the findings of the inventors of the present application, containing a secondary particle of an active material in an active material layer may cause short circuits between the cathode and the anode due to the secondary particle entering into the solid electrolyte layer, penetrating through the solid electrolyte layer or the like when the stack of the active material layer and the solid electrolyte layer is pressed.

Solution to Problem

The present application discloses, as one means for solving the above described problem, a method for producing an all solid-state battery, the method comprising: a first step of stacking an active material layer over at least one surface of a solid electrolyte layer to constitute a stack; and a second step of pressing the stack to constitute a compact, wherein in the first step, the active material layer contains a secondary particle of an active material, and in the second step, the secondary particle is crushed to primary particles by said pressing, the secondary particle being present in an interfacial portion between the active material layer and the solid electrolyte layer.

In the producing method of this disclosure, the relation of $0<(X/Y)\leq0.1$ may be satisfied wherein X is a diameter of the primary particle ($\mu m$) and Y is a thickness of the solid electrolyte layer ($\mu m$).

In the producing method of this disclosure, in the first step, a first active material layer may be stacked over one surface of the solid electrolyte layer, and a second active material layer may be stacked over another surface of the solid electrolyte layer to constitute the stack, the first active material layer having an opposing part that is opposite to the second active material layer across the solid electrolyte layer, and an extending part that extends beyond the opposing part in a width direction, the first active material layer containing a secondary particle of a first active material, and in the second step, the secondary particle of the first active material may be crushed by said pressing, the secondary particle of the first active material being present on an interfacial portion between the opposing part of the first active material layer and the solid electrolyte layer.

In the producing method of this disclosure, in the first step, the second active material layer may have an opposing part that is opposite to the first active material layer across the solid electrolyte layer, and contain a secondary particle of a second active material, and in the second step, the secondary particle of the second active material may be crushed by said pressing, the secondary particle of the second active material being present on an interfacial portion between the opposing part of the second active material layer and the solid electrolyte layer.

In the producing method of this disclosure, in the first step, the stack may have unevenness over a surface of the active material layer, the unevenness being caused by the secondary particle, and in the second step, the secondary particle may be crushed to the primary particles by said pressing to reduce the unevenness over the surface of the active material layer in the interfacial portion between the active material layer and the solid electrolyte layer, the secondary particle being present in the interfacial portion.

The present application discloses, as one means for solving the problem, an all solid-state battery comprising: a solid electrolyte layer; a first active material layer that is provided for one surface of the solid electrolyte layer; and a second active material layer that is provided for another surface of the solid electrolyte layer, wherein the first active material layer has an opposing part that is opposite to the second active material layer across the solid electrolyte layer, and an extending part that extends beyond the opposing part in a width direction, when a cross section of the first active material layer is observed, it is observed that a first active material that is included in the opposing part is constituted of a primary particle, and the relation of $0<(X_1/Y)\leq0.1$ is satisfied wherein $X_1$ is a diameter of the primary particle of the first active material ($\mu m$) and Y is a thickness of the solid electrolyte layer ($\mu m$).

In the all solid-state battery of this disclosure, when the cross section of the first active material layer is observed, the number of secondary particles of the first active material which are included in the extending part per unit area may be larger than the number of the secondary particles of the first active material which are included in the opposing part per unit area.

In the all solid-state battery of this disclosure, the second active material layer may have an opposing part that is opposite to the first active material layer across the solid electrolyte layer, when a cross section of the second active material layer is observed, a second active material that is included in the opposing part may be constituted of the primary particle, and the relation of $0<(X_2/Y)\leq0.1$ is satisfied wherein $X_2$ may be a diameter of the primary particle of the second active material (μm) and Y is the thickness of the solid electrolyte layer.

Advantageous Effects

In the method for producing an all solid-state battery of the present disclosure, a secondary particle of an active material is crushed to primary particles in an interfacial portion between an active material layer and a solid electrolyte layer when a stack of the active material layer and the solid electrolyte layer is pressed. That is, it can be suppressed that the secondary particle of an active material enters into or penetrates through the solid electrolyte layer when the active material layer and the solid electrolyte layer are pressed, and short circuits between a cathode and an anode can be suppressed.

In the all solid-state battery of the present disclosure, an active material in an opposing part of an active material layer which is a part to which pressure is applied by pressing is composed of a primary particle. That is, it is kept suppressed that a secondary particle of an active material enters into or penetrates through a solid electrolyte layer. In the all solid-state battery of the present disclosure, the primary particle of an active material has a predetermined particle diameter, and is small enough for the thickness of the solid electrolyte layer. Therefore, even if the primary particle of an active material enters into the solid electrolyte layer, it can be suppressed that the primary particle penetrates through the solid electrolyte layer, and that short circuits between a cathode an anode occur.

BRIEF DESCRIPTION OF DRAWINGS

FIGS. 2A to 2C are schematic views for illustrating one example of the method S10 for producing an all solid-state battery;

DETAILED DESCRIPTION OF EMBODIMENTS

1. Method for Producing All Solid-State Battery

Figure 1:
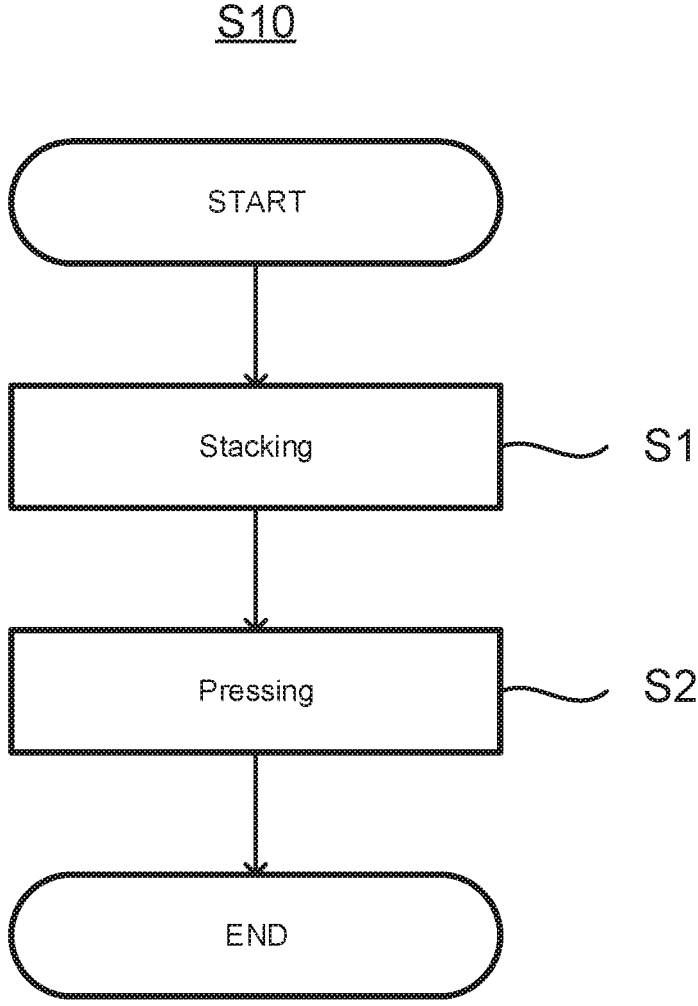
FIG. 1 is a flow for illustrating a method S10 for producing an all solid-state battery.

FIG. 1 shows the flow of a method S10 for producing an all solid-state battery. FIGS. 2A to 2C schematically show one example of the producing method S10. As shown in FIGS. 1 to 2C, the producing method S10 comprises a first step S1 of stacking an active material layer 2 over at least one surface of a solid electrolyte layer 1 to constitute a stack 10; and a second step S2 of pressing the stack 10 to constitute a compact 100. As shown in FIG. 2A, in the first step S1, the active material layer 2 contains a secondary particle 2a, 2a, . . . of an active material. As shown in FIGS. 2B and 2C, in the second step S2, the secondary particle 2a, 2a, . . . is crushed to primary particles 2b, 2b, . . . by said pressing, the secondary particle 2a, 2a, . . . being present in an interfacial portion between the active material layer 2 and the solid electrolyte layer 1.

1.1. First Step

In the first step S1, the active material layer 2 is stacked over at least one surface of the solid electrolyte layer 1 to constitute the stack 10.

1.1.1. Solid Electrolyte Layer

The solid electrolyte layer 1 contains at least a solid electrolyte 1a. The solid electrolyte layer 1 may optionally contain other constituents such as binder.

Any known one as a solid electrolyte for all solid-state batteries may be employed for the solid electrolyte 1a to be contained in the solid electrolyte layer 1. For example, a sulfide solid electrolyte is preferably employed. Any inorganic solid electrolyte other than a sulfide solid electrolyte may be contained as long as a desired effect can be exerted. Specific examples of a sulfide solid electrolyte include solid electrolytes containing Li, P and S as constituent elements. Specific examples thereof include $Li_2S$—$P_2S_5$, $Li_2S$—$SiS_2$, $LiI$—$Li_2S$—$SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$ and $Li_2S$—$P_2S_5$—$GeS_2$. Among them, sulfide solid electrolytes containing $Li_2S$—$P_2S_5$ are especially more preferable. Only one may be used individually, or two or more may be mixed to be used as the solid electrolyte 1a. The shape of the solid electrolyte 1a is not specifically limited. For example, the solid electrolyte 1a is preferably in the form of a particle. The content of the solid electrolyte 1a in the solid electrolyte layer 1 is not specifically limited, and may be equivalent to that of a solid electrolyte in a solid electrolyte layer of a conventional all solid-state battery.

Any known one as binder employed for all solid-state batteries may be employed for the binder contained in the solid electrolyte layer 1 as an optional constituent. For example, at least one selected from styrene-butadiene rubber (SBR), carboxymethyl cellulose (CMC), acrylonitrile-butadiene rubber (ABR), butadiene rubber (BR), butyl rubber (IIR), polyvinylidene fluoride (PVdF), polytetrafluoroethylene (PTFE), a copolymer thereof, a copolymer thereof and another constituent and the like may be used. The content of the binder in the solid electrolyte layer 1 is not specifically restricted, and may be equivalent to that of binder in a solid electrolyte layer of a conventional all solid-state battery.

The solid electrolyte layer 1 having the above described structure can be easily produced via processes such as placing the solid electrolyte and optionally the binder in a non-aqueous solvent, and kneading them to obtain a slurry (pasty) electrolyte composition, thereafter applying this electrolyte composition to a surface of a base material or a surface an active material layer described later, and drying the applied surface. Alternatively, the solid electrolyte layer may be formed by dry molding. When the solid electrolyte layer 1 in the form of a sheet is formed as described above, the thickness of the solid electrolyte layer 1 is, for example, preferably 0.1 μm to 1 mm, and more preferably 1 μm to 100 μm.

1.1.2. Active Material Layer

The active material layer 2 contains at least an active material. The active material layer 2 may optionally contain a solid electrolyte, binder, a conductive additive, other additives (such as thickener), etc. The active material layer 2 can be either a cathode active material layer or an anode active material layer according to an active material contained in the active material layer 2. When a cathode active material layer that is described later is stacked over one surface of the solid electrolyte layer 1 as a first active material layer, an anode active material layer that is described later is stacked over the other surface of the solid electrolyte layer 1 as a second active material layer. When the anode active material layer that is described later is stacked over one surface of the solid electrolyte layer 1 as the first active material layer, the cathode active material layer that is described later is stacked over the other surface of the solid electrolyte layer 1 as the second active material layer.

Any known one as a cathode active material for all solid-state batteries may be employed for a cathode active material contained in the cathode active material layer. Among known active materials, a material showing a nobler charge/discharge potential than an anode active material that is described later may be the cathode active material. Examples of the cathode active material include lithium-containing oxides such as lithium cobaltate, lithium nickelate, $Li(Ni,Mn,Co)O_2(Li_{1+\alpha}Ni_{1/3}Mn_{1/3}Co_{1/3}O_2)$, lithium manganate, spinel lithium composite oxides, lithium titanate and lithium metal phosphates ($LiMPO_4$ where M is at least one selected from Fe, Mn, Co and Ni). One cathode active material may be used alone, and two or more cathode active materials may be mixed to be used. The cathode active material may have a coating layer of lithium niobate, lithium titanate, lithium phosphate or the like over its surface. The content of the cathode active material in the cathode active material layer is not specifically limited, and may be equivalent to that of a cathode active material in a cathode active material layer of a conventional all solid-state battery.

Any known one as an anode active material for all solid-state batteries may be employed for an anode active material contained in the anode active material layer. Among known active materials, a material showing a baser charge/discharge potential than the above described cathode active material may be the anode active material. Examples of the anode active material include silicon-based active materials such as Si and Si alloys; carbon-based active materials such as graphite and hard carbon; various oxide-based active materials such as lithium titanate; and metal lithium and lithium alloys. One anode active material may be used alone, and two or more anode active materials may be mixed to be used. The content of the anode active material in the anode active material layer is not specifically limited, and may be equivalent to that of an anode active material in an anode active material layer of a conventional all solid-state battery.

In the first step S1, the active material layer 2 contains secondary particles 2a, 2a, . . . of an active material. One secondary particle 2a is the agglomerate of the primary particles 2b, 2b, . . . of an active material. In the active material layer 2, a specific value of the particle diameter of the secondary particle 2a is not specifically limited. For example, the diameter of the secondary particle of an active material contained in the active material layer 2 is preferably 0.5 μm to 100 μm. The lower limit thereof is more preferably no less than 1 μm, and the upper limit thereof is more preferably no more than 50 μm.

In the first step S1, the particle diameter of the primary particle 2b that is a component of the secondary particle 2a of an active material is not specifically limited, and is, for example, preferably 1 nm to 100 μm. The lower limit thereof is more preferably no less than 5 nm, further preferably no less than 10 nm, and especially preferably no less than 50 nm. The upper limit thereof is more preferably no more than 30 μm, and further preferably no more than 10 μm. As described later, the thickness Y of the solid electrolyte layer 1 is preferably adjusted according to the diameter X of the primary particle of an active material.

Any known one as a solid electrolyte for all solid-state batteries may be employed for the solid electrolyte contained in the active material layer 2 as an optional constituent. For example, a sulfide solid electrolyte as described above is preferably employed. Any inorganic solid electrolyte other than a sulfide solid electrolyte may be contained as long as a desired effect can be exerted. One solid electrolyte may be used alone, and two or more solid electrolytes may be mixed to be used. The shape of the solid electrolyte is not specifically limited, and for example, is preferably in the form of a particle. The content of the solid electrolyte in the active material layer 2 is not specifically limited, and may be equivalent to that of a solid electrolyte in an active material layer of a conventional all solid-state battery.

Any one known as a conductive additive employed for all solid-state batteries may be employed for the conductive additive contained in the active material layer 2 as an optional constituent. Examples thereof include carbon materials such as acetylene black (AB), Ketjen black (KB), vapor grown carbon fibers (VGCF), carbon nanotubes (CNT), carbon nanofibers (CNF) and graphite; and metallic materials such as nickel, aluminum and stainless steel. Especially a carbon material is preferable. One conductive additive may be used alone, and two or more conductive additives may be mixed to be used. The shape of the conductive additive is not specifically limited, and for example, is preferably in the form of a particle. The content of the conductive additive in the active material layer 2 is not specifically limited, and may be equivalent to that of a conductive additive in an active material layer of a conventional all solid-state battery.

Any known one as binder employed for all solid-state batteries may be employed for binder contained in the active material layer 2 as an optional constituent. For example, at least one selected from styrene-butadiene rubber (SBR), carboxymethyl cellulose (CMC), acrylonitrile-butadiene rubber (ABR), butadiene rubber (BR), butyl rubber (IIR), polyvinylidene fluoride (PVdF), polytetrafluoroethylene (PTFE), a copolymer thereof, a copolymer thereof and another constituent, and the like may be used. The content of the binder in the active material layer 2 is not specifically restricted, and may be equivalent to that of binder in an active material layer of a conventional all solid-state battery.

The active material layer 2 having the above described structure can be easily produced via processes such as placing the active material, and the solid electrolyte, the binder, the conductive additive, etc., which are optionally contained, in a non-aqueous solvent, and kneading them to obtain a slurry (pasty) electrode composition, thereafter applying this electrode composition to a surface of a base material, a current collector, or the solid electrolyte layer, and drying the applied surface. As described above, since the active material layer 2 contains the secondary particles 2a, 2a, . . . of an active material and is superior in dispersiveness in liquid etc., the slurry (pasty) electrode composition can be easily made. The active material layer can be produced by not only such a wet process but also a dry process. When the active material layer in the form of a sheet is formed as described above, the thickness of the active material layer is, for example, preferably 0.1 μm to 1 mm, and more preferably 1 μm to 100 μm.

1.1.3. Stack

In the first step S1, the active material layer 2 is stacked over at least one surface of the solid electrolyte layer 1, to obtain the stack 10. As described above, when the active material layer 2 is stacked over each surface of the solid electrolyte layer 1, an active material layer on one surface is a cathode active material layer and an active material layer on the other surface is an anode active material layer. A way of stacking the solid electrolyte layer 1 and the active material layer 2 each other is not specifically limited. For example, any way may be employed such as separately preparing the solid electrolyte layer 1 and the active material layer 2 and then stacking them each other; applying material to constitute the solid electrolyte layer 1 to a surface of the active material layer 2 in a wet process and dry the surface; applying material to constitute the active material layer 2 to a surface of the solid electrolyte layer 1 in a wet process and dry the surface; and stacking granular material to constitute the solid electrolyte layer 1 and granular material to constitute the active material layer each other in a dry process.

While not shown in FIGS. 2A to 2C, the stack 10 may have a current collector layer on a surface of the active material layer 2 which is on the opposite side of the solid electrolyte layer 1. That is, in the second step S2 described later, the active material layer 2 and the solid electrolyte layer 1 may be pressed together with the current collector layer. The current collector layer may be composed of metal foil, metal mesh, or the like. Metal foil is especially preferable. Examples of metal to constitute the current collector layer include copper, stainless steel, nickel, chromium, gold, platinum, aluminum, iron, titanium, zinc and cobalt. A proper metal may be selected according to material constituting the active material layer 2. The current collector layer may be metal foil or a base material which is plated with metal as described above or on which metal as described above is deposited. The thickness of the current collector layer is not specifically limited, and for example, is preferably 0.1 μm to 1 mm, and is more preferably 1 μm to 100 μm.

The shape of the stack 10 as a whole is not specifically limited. The stack, both end faces of which in the stacking direction are flat, is preferable in view of easy pressing in the second step S2.

1.2. Second Step

In the second step S2, the stack 10 is pressed to be a compact 100. In the second step S2, the secondary particle 2a, 2a, . . . is crushed to primary particles 2b, 2b, . . . by pressing the stack 10, the secondary particle 2a, 2a, . . . being present in an interfacial portion between the active material layer 2 and the solid electrolyte layer 1. In the present application, "the secondary particle being present in an interfacial portion" means a secondary particle exposing to the surface of the active material layer on the solid electrolyte layer side. The secondary particle 2a present in the interfacial portion is crushed to the primary particles 2b, which makes it possible to suppress the secondary particle 2a entering into or penetrating through the solid electrolyte layer 1.

In the second step S2, all the secondary particles 2a, 2a, . . . to which pressure is applied by pressing are preferably crushed to the primary particles 2b, 2b, . . . .

However, some secondary particles 2a may be inevitably left due to industrial processes. In view of this, in the present application, it is regarded that all the secondary particles 2a, 2a, . . . are crushed when the proportion of the number of the secondary particles of an active material present in the interfacial portion within a range to which pressure is applied by pressing is no more than 10% (no more than 10 particles in 100 particles) to the total number of particles of an active material (in the case of the secondary particle, one loaf of the secondary particle is counted as one). As described later, in the second step S2, part of the active material layer 2 of the stack 10 (extending part) may be out of the range to which pressure is applied by pressing. In this case, only the secondary particles 2a, 2a, . . . present in the interfacial portion within the range to which pressure is applied in the active material layer 2 have to be crushed, and the secondary particles 2a, 2a, . . . out of the range to which pressure is applied may be left.

In the second step S2, the secondary particles 2a, 2a, . . . contained in the active material layer 2 are crushed to the primary particles 2b, 2b, . . . without entering into the solid electrolyte layer 1 as they are. That is, the secondary particle 2a is crushed before the pressure reaches a necessary level for the secondary particles 2a, 2a, . . . to enter into the solid electrolyte layer 1. In other words, it is better to employ one that is easily crushed as the secondary particles 2a, 2a, . . . in order to more properly crush the secondary particles 2a, 2a, . . . present in the interfacial portion between the active material layer 2 and the solid electrolyte layer 1 to the primary particles 2b, 2b, . . . when the stack 10 is pressed. For example, when the secondary particle 2a of an active material is produced, the sintering temperature is lowered when the primary particles 2b, 2b, . . . are agglomerated to constitute the secondary particle 2a, which makes it possible to lower the coupling strength of the primary particles 2b, 2b, . . . with each other in the secondary particle 2a and as a result, the secondary particle 2a that is easy to be crushed is obtained.

A way of pressing the stack 10 is not specifically limited. Any way that makes it possible to properly apply pressure to the stack 10 has only to be employed. Examples thereof include roll pressing and flat pressing. A pressure applied when the stack 10 is pressed has only to be such an extent that the secondary particles 2a, 2a, . . . to be crushed can be crushed to the primary particles 2b, 2b, . . . . For example, the pressure is preferably 0.1 ton/cm to 10 ton/cm.

In the second step S2, only the secondary particles 2a, 2a, . . . present in the interfacial portion between the solid electrolyte layer 1 and the active material layer 2 have to be crushed. The secondary particle 2a present inside the active material layer 2 or the secondary particle 2a present on the surface of the active material layer 2 which is on the opposite side of the solid electrolyte layer 1 is not necessarily crushed. In view of obtaining a more significant effect, all the secondary particles 2a, 2a, . . . present in the interfacial portion of the active material layer 2, inside the active material layer 2, and on the opposite surface of the active material layer 2 within the range to which pressure is applied in the active material layer 2 are preferably crushed. Specifically, as shown in FIG. 2C, in the compact 100, active materials contained in the active material layer 2 preferably disperse over the surfaces and the inside of the active material layer 2 as the primary particles 2b, 2b, . . . .

Figure 3:
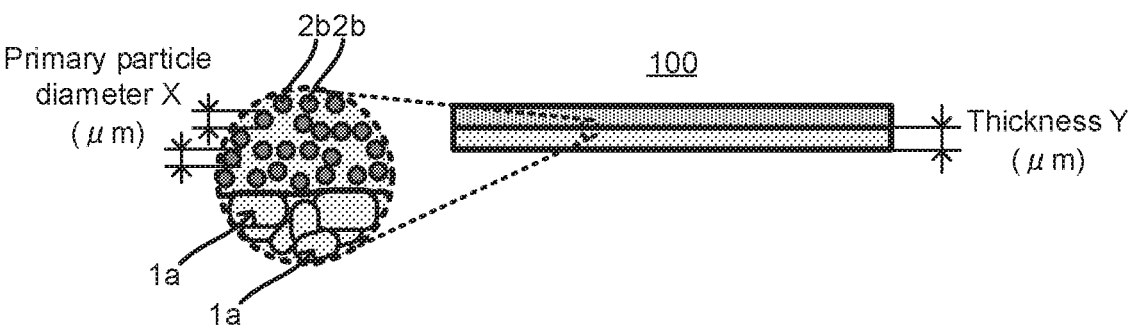
FIG. 3 is a schematic view for illustrating one example of a compact 100 that is obtained by the method S10 for producing an all solid-state battery.

According to the findings of the inventors of the present application, satisfying the relation of $0<(X/Y)\leq0.1$ wherein X is a diameter of the primary particle 2b of an active material (μm) and Y is a thickness of the solid electrolyte layer 1 (μm) as shown in FIG. 3 makes it possible to further suppress the active material particle entering into or penetrating through the solid electrolyte layer. "Diameter of the primary particle of an active material" and "thickness of the solid electrolyte layer" can be easily identified by observing a cross section of the compact 100 by means of SEM. "Diameter of the primary particle of an active material" means the Feret diameter of the primary particle on a cross-sectional image of the compact 100 obtained by SEM. In this case, as shown in FIG. 3, the Feret diameter of the primary particle of the active material is measured using tangents whose direction is same as a face of the compact 100 (the direction of these tangents are perpendicularly to that of stacking the active material layer and the solid electrolyte layer in the compact 100).

1.3. Other Steps

Figure 4A:
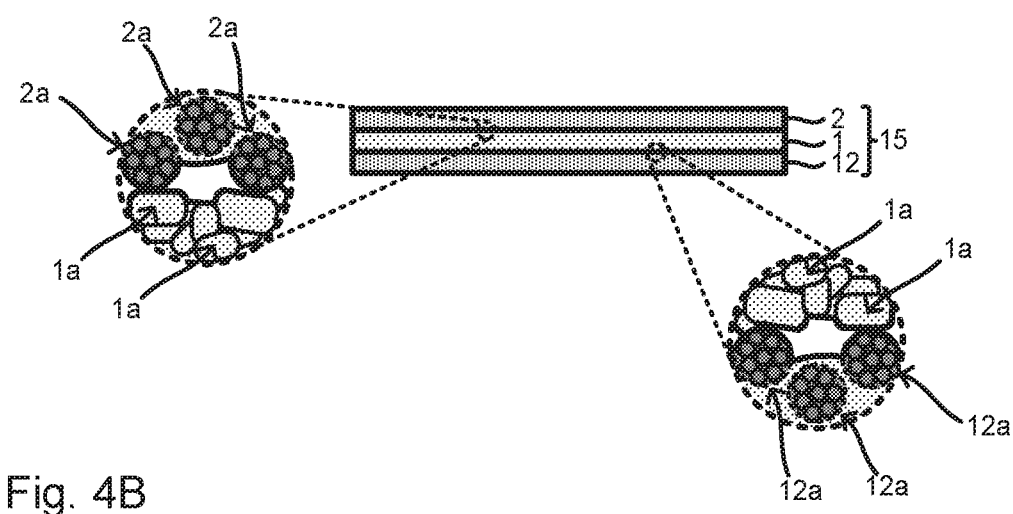
FIGS. 4A to 4C are schematic views for illustrating one example of the method S10 for producing an all solid-state battery.
Figure 4B:
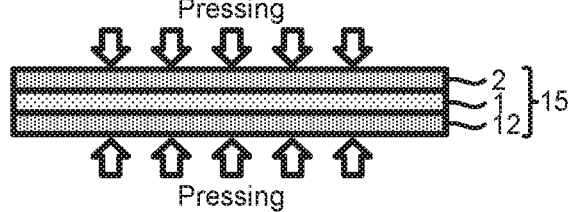
Figure 4C:
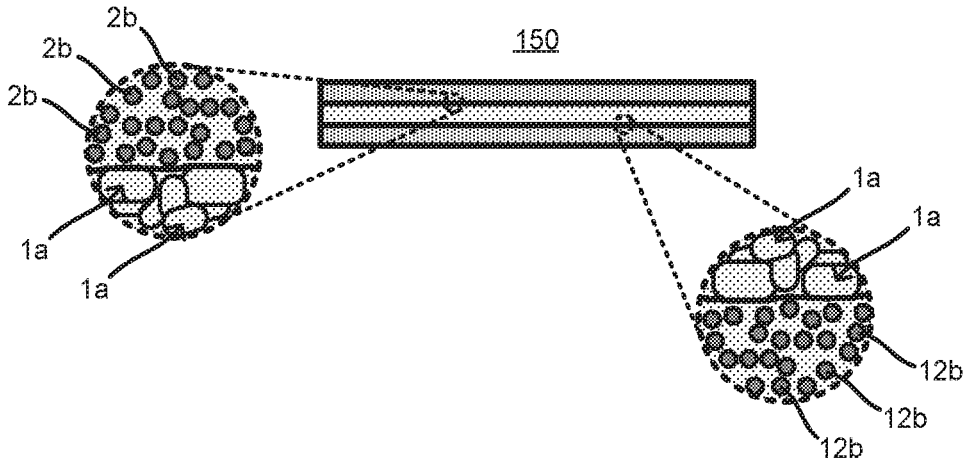

In the first step S1 and the second step S2, when the active material layer 2 is stacked over only one surface of the solid electrolyte layer 1, an active material layer is stacked over the other surface of the solid electrolyte layer 1 as well. In this case, as shown in FIG. 4A to 4C, the active material layer is preferably stacked over the other surface of the solid electrolyte layer 1 to be pressed via the first step S1 and the second step S2 as well. That is, the producing method S10 preferably includes the first step S1 of stacking the first active material layer 2 onto one surface of the solid electrolyte layer 1 and stacking a second active material layer 12 over the other surface thereof to constitute the stack 15, and the second step S2 of pressing the stack 15 to constitute the compact 150, wherein in the first step S1, the first active material layer 2 contains the secondary particle 2a of a first active material, the second active material layer 12 contains a secondary particle 12a of a second active material, and in the second step S2, by pressing the stack 15, the secondary particle 2a of the first active material present in the interfacial portion between the first active material layer 2 and the solid electrolyte layer 1 is crushed to the primary particles 2b and the secondary particle 12a of the second active material present in the interfacial portion between the second active material layer 12 and the solid electrolyte layer 1 is crushed to primary particles 12b. Material that constitutes the second active material layer 12 etc. are as described above, and detailed description thereof is omitted here.

A single cell can be composed by holding the solid electrolyte layer between a pair of the active material layers (cathode active material layer and anode active material layer) as described above. When an all solid-state battery is produced, one may stack a plurality of such single cells to compose a stacked battery. Such a single cell may be wound to constitute a wound battery. An all solid-state battery can be produced via steps such as attaching necessary terminals etc. to a single cell that is made as described above, or the like to be enclosed in a battery case. Steps other than the first step S1 and the second step S2 may be the same as conventional ones. Here, further description is omitted.

1.4. Application Embodiment

Figure 5:
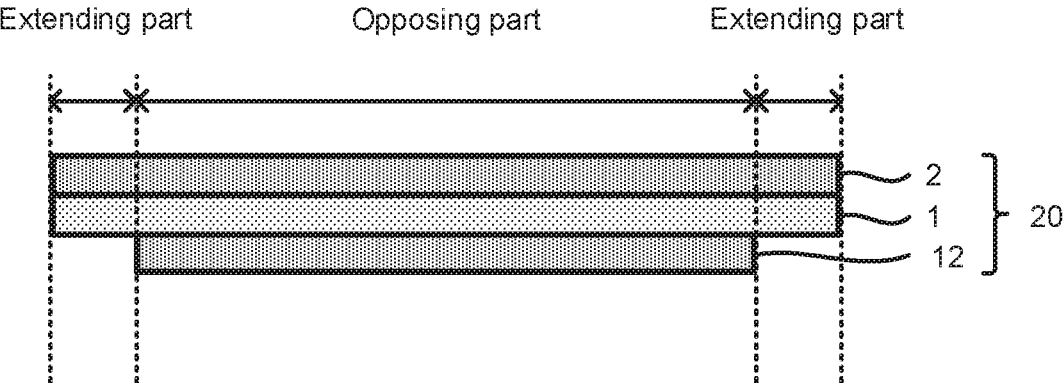
FIG. 5 is a schematic view for illustrating "opposing part" and "extending part" of an active material layer.
Figure 6A:
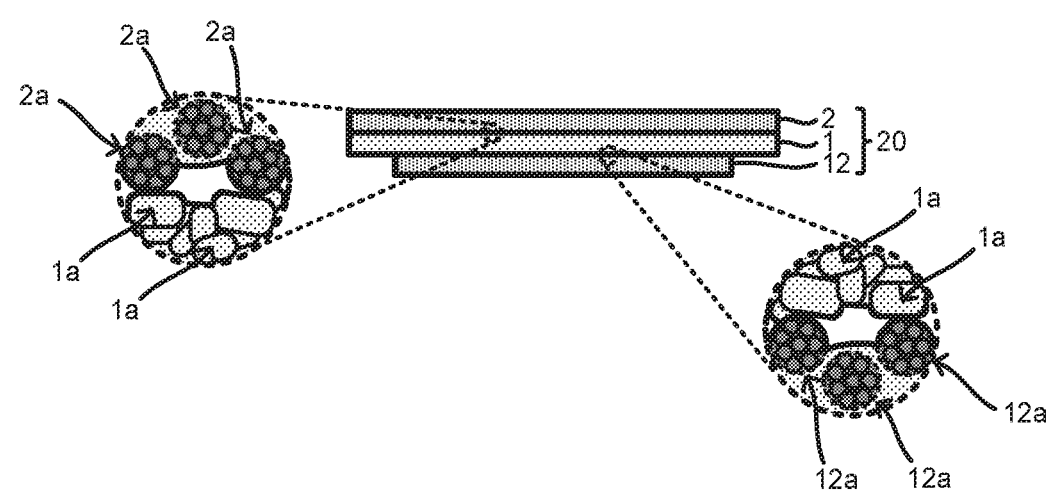
FIGS. 6A to 6C are schematic views for illustrating one example of the method S10 for producing an all solid-state battery.
Figure 6B:
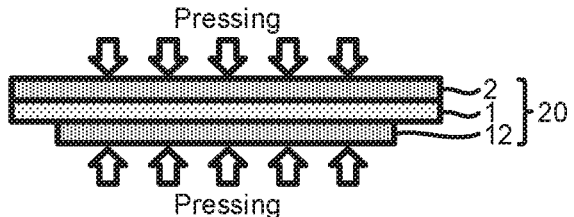
Figure 6C:
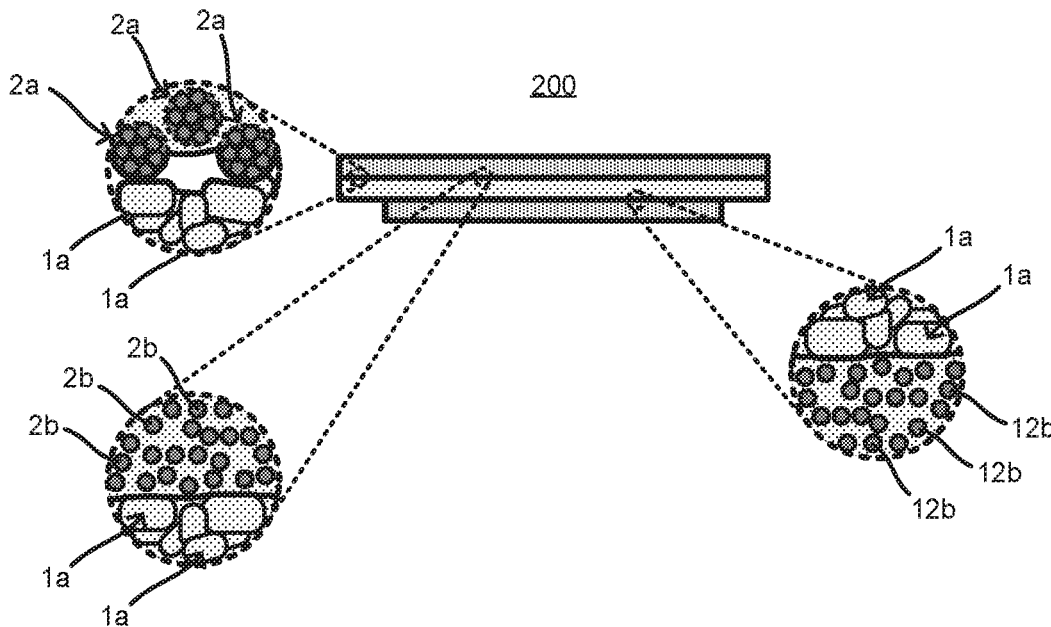

When an all solid-state battery is produced, a cathode active material layer may be different from an anode active material layer in area for the purpose of, for example, adjusting the cathode capacity and the anode capacity. Examples of such a case include a case where the first active material layer 2 has an opposing part that is opposite to the second active material layer 12 across the solid electrolyte layer 1, and extending parts that extend beyond the opposing part in a width direction when the first active material layer 2 is stacked over one surface of the solid electrolyte layer 1 and the second active material layer 12 is stacked over the other surface thereof to constitute a stack 20 as shown in FIGS. 5 to 6C. When the stack 20 as described is pressed, while pressure is applied to the opposing part, almost no pressure is applied to the extending parts. Therefore, in a compact 200 after pressing, the opposing part is different from the extending parts in the state of the particle of an active material contained in the active material layer 2.

In the producing method S10 of this disclosure, only the secondary particle of an active material present in the opposing part has to be crushed, and the secondary particle of an active material in the extending parts where pressure is released may be left as it is. That is, as shown in FIGS. 5 to 6C, in the producing method S10 of the present disclosure, in the first step S1, the first active material layer 2 is stacked over one surface of the solid electrolyte layer 1, and the second active material layer 12 is stacked over another surface of the solid electrolyte layer 1 to constitute the stack 20 (FIGS. 5 and 6A), the first active material layer 2 having an opposing part that is opposite to the second active material layer 12 across the solid electrolyte layer 1, and an extending part that extends beyond the opposing part in a width direction (FIG. 5), and the first active material layer 2 may contain the secondary particle 2a, 2a, . . . of the first active material (FIG. 6A). In this case, in the second step S2, the secondary particle 2a, 2a, . . . of the first active material is preferably crushed by pressing the stack 20, the secondary particle 2a, 2a, . . . of the first active material being present on an interfacial portion between the opposing part of the first active material layer 2 and the solid electrolyte layer 1 (FIGS. 6B and 6C). In the extending parts, the secondary particle 2a entering into or penetrating through the solid electrolyte layer 1 is not concern, and even if the secondary particle 2a enters into or penetrates through the solid electrolyte layer 1 in the extending parts, the secondary particle 2a is hard to reach the counter electrode as apparent from the structure of the battery. Therefore, it can be said that short circuits between the cathode and anode are hard to occur even if the secondary particles 2a, 2a, . . . included in the extending parts are left as they are without being crushed.

In the embodiment shown in FIGS. 5 to 6C, the secondary particles 12a, 12a, . . . of an active material are preferably crushed to the primary particles 12b, 12b, . . . in the second active material layer 12 as well as the first active material layer 2. That is, in the producing method S10 of the present disclosure, in the first step S1, the second active material layer 12 has an opposing part that is opposite to the first active material layer 2 across the solid electrolyte layer 1 (FIG. 5), and may contain a secondary particle 12a, 12a, . . . of a second active material (FIG. 6A). In this case, in the second step S2, the secondary particle 12a of the second active material is preferably crushed by pressing the stack 20, the secondary particle 12a of the second active material being present on an interfacial portion between the opposing part of the second active material layer 12 and the solid electrolyte layer 1 (FIGS. 6B and 6C). This makes it possible to further suppress occurrence of short circuits between the anode.

In the producing method S10 of the present disclosure, the active material layer 2 having the extending parts may be either the cathode active material layer or the anode active material layer. Specifically, in view of making the cathode capacity and the anode capacity same, the active material layer 2 having the extending parts is preferably the anode active material layer.

1.5. Addition

As shown in FIGS. 2A to 2C and 6A to 6C, in the producing method S10 of the present disclosure, it is believed that in the first step S1, the stack 10 or 20 has unevenness over a surface of the active material layer 2, the unevenness being caused by the secondary particle 2a, and in the second step S2, the secondary particle 2a, 2a, . . . is crushed to the primary particles 2b, 2b, . . . by pressing the stack 10 or 20, which makes it possible to reduce the unevenness over the surface of the active material layer 2 in the interfacial portion between the active material layer 2 and the solid electrolyte layer 1, the secondary particle 2a, 2a, . . . being present in the interfacial portion. Reducing unevenness over the surfaces of the active material layer 2 as described above makes it possible to further suppress, for example, the active material layer 2 entering into the solid electrolyte layer 1.

1.6. Effect

As described above, in the producing method S10, when the stack 10, 15 or 20 of the active material layer 2 and the solid electrolyte layer 1 is pressed, the secondary particle 2a of an active material is crushed to the primary particles 2b, 2b, . . . . That is, when the stack 10, 15 or 20 of the active material layer 2 and the solid electrolyte layer 1 is pressed, it can be suppressed that the secondary particle 2a of an active material enters into or penetrates through the solid electrolyte layer 1, and that short circuits between the cathode and the anode occur.

2. All Solid-State Battery

Figure 7:
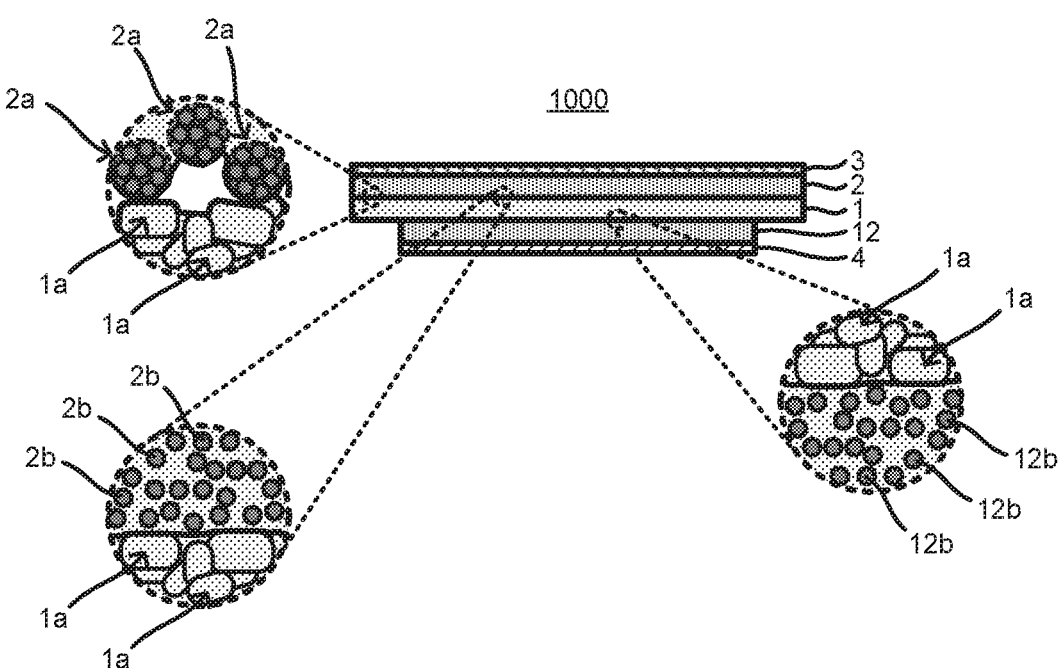
FIG. 7 is a schematic view for illustrating one example of structure of an all solid-state battery 1000.

FIG. 7 schematically shows the structure of an all solid-state battery 1000. In FIG. 7, terminals, a battery case, etc. are omitted for convenient description. A feature of the all solid-state battery 1000 shown in FIG. 7 is to include the solid electrolyte layer 1, the first active material layer 2 provided for one surface of the solid electrolyte layer 1, and the second active material layer 12 provided for the other surface of the solid electrolyte layer 1, the first active material layer 2 having the opposing part that is opposite to the second active material layer 12 across the solid electrolyte layer 1, and the extending parts that extend beyond the opposing part in the width direction, wherein when a cross section of the first active material layer 2 is observed, the first active material included in the opposing part is composed of the primary particles 2b, 2b, . . . , and the relation of $0<(X_1/Y)\leq0.1$ is satisfied wherein $X_1$ is a diameter of the primary particles 2b, 2b, . . . of the first active material (μm) and Y is a thickness of the solid electrolyte layer 1 (μm). Constituent materials of the layers 1, 2 and 12 of the all solid-state battery 1000 are as described above. Definitions and a measuring method of $X_1$ and Y are also as described above. Description thereof is omitted here.

In the all solid-state battery 1000, the first active material included in the opposing part (see FIG. 4) is preferably constituted of the primary particle 2b only. However, the opposing part may inevitably include the secondary particle 2a. That is, it is regarded that the active material included in the opposing part is constituted of the primary particle when the proportion of the number of the secondary particles of an active material included in the opposing part is no more than 10% (no more than 10 particles in 100 particles) to the total number of particles of an active material (in the case of the secondary particle, one loaf of the secondary particle is counted as one).

While the active material included in the opposing part is constituted of the primary particle as described above, it is no problem if the active material included in the extending parts is the secondary particle. This is because in the extending parts, the secondary particle 2a is difficult to, for example, enter into the solid electrolyte layer 1 as described above. That is, in the all solid-state battery 1000, when a cross section of the first active material layer 2 is observed, the number of the secondary particles 2a of the first active material which are included in the extending part per unit area may be larger than the number of the secondary particles 2a of the first active material which are included in the opposing part per unit area. In other words, when a cross section of the first active material layer 2 is observed, the relation of $(N_2/N_1)<(N_4/N_3)$ may be satisfied wherein $N_1$ is the total number of particles of the first active material included in the opposing part (in the case of the secondary particle, one loaf of the secondary particle is counted as one), $N_2$ is the total number of the secondary particles 2a, 2a, . . . in particles of the first active material included in the opposing part, $N_3$ is the total number of particles of the first active material included in the extending parts (in the case of the secondary particle, one loaf of the secondary particle is counted as one), and $N_4$ is the total number of the secondary particles 2a, 2a, . . . in particles of the first active material included in the extending parts.

In the all solid-state battery 1000, the active material is preferably constituted of the primary particles 12b, 12b, . . . in not only the first active material layer 2 but also the second active material layer 12. That is, in the all solid-state battery 1000, preferably, the second active material layer 12 has an opposing part that is opposite to the first active material layer 2 across the solid electrolyte layer 1, when a cross section of the second active material layer 12 is observed, the second active material that is included in the opposing part is constituted of the primary particle 12b, 12b, . . . , and the relation of $0<(X_2/Y)\leq0.1$ is satisfied wherein $X_2$ is a diameter of the primary particle 12b, 12b, . . . of the second active material (μm) and Y is the thickness of the solid electrolyte layer 1. This makes it possible to further suppress occurrence of short circuits between the cathode and the anode. Definitions and a measuring method of $X_2$ and Y are as described above. Description thereof is omitted here.

The all solid-state battery 1000 may include current collector layers 3 and 4, terminals, etc. in addition to the solid electrolyte layer 1 and the active material layers 2 and 12. They are known and thus further description thereof is omitted here.

As described above, in the all solid-state battery 1000, the active material is constituted of the primary particle 2b in the opposing part of the active material layer 2, which is a part to which pressure is applied by pressing. That is, the secondary particle is in a state of suppressing its entering into or penetrating through the solid electrolyte layer. In the all solid-state battery 1000, the primary particle 2b of the active material has a predetermined particle diameter, and is sufficiently small for the thickness of the solid electrolyte layer 1. Therefore, even if the primary particle 2b of an active material enters into the solid electrolyte layer 1, it can be suppressed that the primary particle 2b penetrates through the solid electrolyte layer 1, and that short circuits between the cathode and anode occur.

EXAMPLES

Example 1

1. Making Cathode

A cathode active material ($LiNbO_3$-coated $LiNi_{1/3}Mn_{1/3}Co_{1/3}O_2$) and a sulfide solid electrolyte ($Li_3PS_4$) were weighed so that their mass ratio was 75:25. Further, 4 mass parts of a PVdF based binder and 5 mass parts of acetylene black as a conductive additive were weighed for 100 mass parts of the active material. They were prepared in a butyl butyrate solvent so that the solid content was 70 wt % and the resultant mixture was kneaded with a stirrer to obtain a cathode paste. The obtained paste was applied onto aluminum foil of 15 μm in thickness by the blade coating method by means of an applicator and the aluminum foil was dried at 120° C. for 3 minutes to obtain a cathode. The properties of the used cathode active material were as follows.

Cathode active material: primary particle diameter: 0.5 μm, secondary particle diameter: 5 μm, strength of secondary particle: low (breaking strength: no more than 1 ton/cm)

2. Making Anode

An anode active material (lithium titanate) and a sulfide solid electrolyte ($Li_3PS_4$) were weighed so that their mass ratio was 50:50. Further, 6 mass parts of a PVdF based binder and 6 mass parts of acetylene black as a conductive additive were weighed for 100 mass parts of the active material. They were prepared in a butyl butyrate solvent so that the solid content was 70 wt % and the resultant mixture was kneaded with a stirrer to obtain an anode paste. The obtained paste was applied onto copper foil of 15 μm in thickness by the blade coating method by means of an applicator and the copper foil was dried at 120° C. for 3 minutes to obtain an anode. The properties of the used anode active material were as follows.

Anode active material: primary particle diameter: 0.5 μm, secondary particle diameter: 6 μm, strength of secondary particle: low (breaking strength: no more than 1 ton/cm)

3. Making Solid Electrolyte Layer

A sulfide solid electrolyte ($Li_3PS_4$) and a butylene rubber based binder were weighed so that their mass ratio was 95:5. They were prepared in a heptane solvent so that the solid content was 70 wt % and the resultant mixture was stirred by means of an ultrasonic dispersive device to obtain a solid electrolyte paste. The obtained paste was applied onto aluminum foil by the blade coating method by means of an applicator, and the aluminum foil was air-dried and thereafter was dried at 100° C. for 30 minutes to obtain a solid electrolyte layer.

4. Making All Solid-State Battery

The cathode, the solid electrolyte layer, and the anode were superposed to be pressed at 1 ton/cm. Thereafter, the resultant was hermetically sealed up in an aluminum laminate film with terminals to obtain an all solid-state battery.

5. Observation of Cross Section

A cross section of the all solid-state battery was observed to confirm the thickness of the solid electrolyte layer and the states of the active material particles. The observation results are shown in the following Table 1.

6. Evaluation of Battery Performance

The all solid-state battery was charged and discharged under the following conditions.

(1) Charge: 2.9 V, C/3, CCCV (2) Stop: 10 minutes (3) Discharge: 1.5 V, C/3, CCCV (4) Stop: 10 minutes (5) Charge: 2.5 V, C/3, CCCV (6) Stop: 24 hours When the voltage after the last stop was no more than 1.5 V, it was determined that short circuits occurred in the all solid-state battery, and it was confirmed how many cells in 10 cells short circuits occurred to in every model to calculate the probability of occurrence of short circuits. The results are shown in the following Table 1.

Example 2

An all solid-state battery was obtained in the same manner as in Example 1 except that a cathode active material including a primary particle whose diameter was 1 μm and a secondary particle whose diameter was 5 μm and which had low strength (breaking strength: no more than 1 ton/cm) was used. The made all solid-state battery was evaluated in the same way as in Example 1. The results are shown in the following Table 1.

Example 3

An all solid-state battery was obtained in the same manner as in Example 1 except that a cathode active material including a primary particle whose diameter was 3 μm and a secondary particle whose diameter was 5 μm and which had low strength (breaking strength: no more than 1 ton/cm) was used. The made all solid-state battery was evaluated in the same way as in Example 1. The results are shown in the following Table 1.

Example 4

An all solid-state battery was obtained in the same manner as in Example 1 except that a cathode active material including a primary particle whose diameter was 5 μm and a secondary particle whose diameter was 10 μm and which had low strength (breaking strength: no more than 1 ton/cm) was used. The made all solid-state battery was evaluated in the same way as in Example 1. The results are shown in the following Table 1.

Comparative Example 1

An all solid-state battery was obtained in the same manner as in Example 1 except that a cathode active material including a primary particle whose diameter was 0.5 μm and a secondary particle whose diameter was 5 μm and which had high strength (breaking strength: over 1 ton/cm) was used. The made all solid-state battery was evaluated in the same way as in Example 1. The results are shown in the following Table 1.

Comparative Example 2

An all solid-state battery was obtained in the same manner as in Example 1 except that a cathode active material including a primary particle whose diameter was 1 μm and a secondary particle whose diameter was 5 μm and which had high strength (breaking strength: over 1 ton/cm) was used. The made all solid-state battery was evaluated in the same way as in Example 1. The results are shown in the following Table 1.

Comparative Example 3

An all solid-state battery was obtained in the same manner as in Example 1 except that a cathode active material including a primary particle whose diameter was 3 μm and a secondary particle whose diameter was 5 μm and which had high strength (breaking strength: over 1 ton/cm) was used. The made all solid-state battery was evaluated in the same way as in Example 1. The results are shown in the following Table 1.

Comparative Example 4

An all solid-state battery was obtained in the same manner as in Example 1 except that a cathode active material including a primary particle whose diameter was 5 μm and a secondary particle whose diameter was 10 μm and which had high strength (breaking strength: over 1 ton/cm) was used. The made all solid-state battery was evaluated in the same way as in Example 1. The results are shown in the following Table 1.

In Examples 1 to 4, when the secondary particle of the cathode active material was produced, the coupling strength of the primary particles to each other in the secondary particle was lowered to lower the strength of the secondary particle by lowering the sintering temperature when the primary particles were agglomerated to constitute the secondary particle. In contrast, in Comparative Examples 1 to 4, the cathode active material was produced by a general method (sintering raw materials) and as a result, the primary particles were firmly coupled to each other in the secondary particle.

Figure 8:
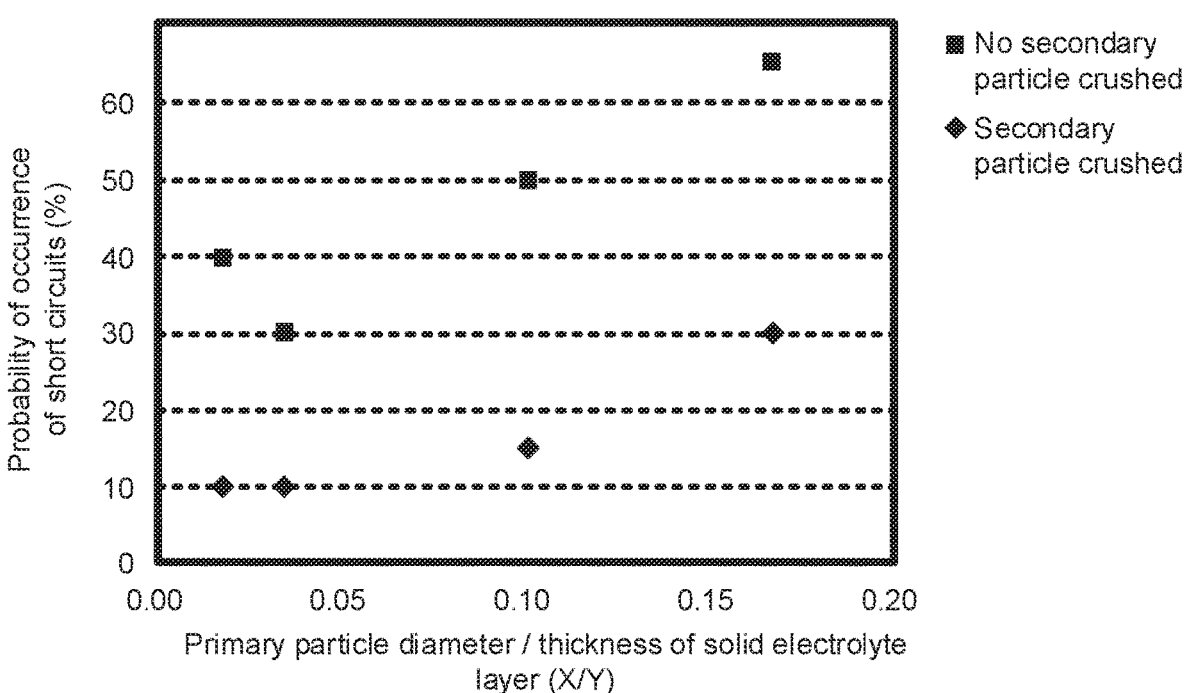
FIG. 8 is a graph showing the relation between the ratio (X/Y) of a primary particle diameter X of an active material to a thickness Y of a solid electrolyte layer, and the probability of occurrence of short circuits in an all solid-state battery.

FIG. 8 is a graph of the relation between the primary particle diameter X (μm) of an active material and the thickness Y (μm) of the solid electrolyte layer. As is apparent from FIG. 8, it is found that when X/Y is no more than 0.1, the probability of occurrence of short circuits may be further outstandingly lowered. That is, in view of exerting a more outstating effect, it can be said that preferably $0 < X/Y \leq 0.1$.

In Examples, the form of the cathode active material in the cathode active material layer was changed to confirm effect. However, the art of the present disclosure can be employed for an anode active material layer as well. That is, the art of the preset disclosure can be employed for at least one of the cathode active material layer and the anode active material layer, and is preferably employed for both of the cathode active material layer and the anode active material layer.

In Examples, the mode of using a specific active material, solid electrolyte, conductive additive, binder, etc. was shown. However, the art of the preset disclosure is not limited to such a specific mode. Even if constituent materials of a battery are different from those in Examples, a secondary particle of an active material is crushed to primary particles when an active material layer and a solid electrolyte layer are pressed, which makes it possible to suppress the secondary particle of an active material entering into or penetrating through the solid electrolyte layer.

INDUSTRIAL APPLICABILITY

The all solid-state battery of the present disclosure can be preferably used as a power source in a wide range such as a small-sized power source for portable devices and an onboard large-sized power source.

REFERENCE SIGNS LIST

1 solid electrolyte layer
1*a* solid electrolyte

TABLE 1

| | Primary particle diameter X (μm) | Secondary particle diameter (μm) | Thickness Y of solid electrolyte layer (μm) | X/Y | Crushed secondary particle | Probability of occurrence of short circuits (%) |
|---|---|---|---|---|---|---|
| Ex. 1 | 0.5 | 5 | 30 | 0.02 | Present | 10 |
| Comp. Ex. 1 | 0.5 | 5 | 30 | 0.02 | None | 40 |
| Ex. 2 | 1 | 5 | 30 | 0.03 | Present | 10 |
| Comp. Ex. 2 | 1 | 5 | 30 | 0.03 | None | 30 |
| Ex. 3 | 3 | 5 | 30 | 0.10 | Present | 15 |
| Comp. Ex. 3 | 3 | 5 | 30 | 0.10 | None | 50 |
| Ex. 4 | 5 | 10 | 30 | 0.17 | Present | 30 |
| Comp. Ex. 4 | 5 | 10 | 30 | 0.17 | None | 65 |

As is apparent from the comparison between Example 1 and Comparative Example 1, the comparison between Example 2 and Comparative Example 2, the comparison between Example 3 and Comparative Example 3 and the comparison between Example 4 and Comparative Example 4 in Table 1, when a secondary particle of an active material having low strength (easy to be crushed) is used and an active material layer and a solid electrolyte layer are stacked to be pressed, the secondary particle of an active material contained in the active material layer is crushed to primary particles, which makes it possible to significantly suppress occurrence of short circuits. This is believed to be because it can be suppressed that the secondary particle of an active material enters into or penetrates through the solid electrolyte layer.

2, 12 active material layer
2*a*, 12*a* secondary particle of active material
2*b*, 12*b* primary particle of active material
3, 4 current collector
10, 15, 20 stack
100, 150, 200 compact
1000 all solid-state battery
What is claimed is:
1. An all solid-state battery comprising:
a solid electrolyte layer;
a first active material layer that is provided for one surface of the solid electrolyte layer; and
a second active material layer that is provided for another surface of the solid electrolyte layer,
wherein the first active material layer has an opposing part that is opposite to the second active material layer across the solid electrolyte layer, and an extending part that extends beyond the opposing part in a width direction, when a cross section of the first active material layer is observed, it is observed that a first active material that is included in the opposing part is constituted of a primary particle, wherein the relation of $0<(X1/Y)\leq0.03$ is satisfied wherein X1 is a diameter of the primary particle of the first active material ($\mu$m) and Y is a thickness of the solid electrolyte layer ($\mu$m), wherein, when the cross section of the first active material layer is observed, a number of secondary particles of the first active material which are included in the extending part per unit area is larger than a number of the secondary particles of the first active material which are included in the opposing part per unit area, wherein in an interfacial portion between the first active material layer and the solid electrolyte layer, only the primary particles are present, or the secondary particles and the primary particles are present, a number of the secondary particles being less than or equal to 10% of a total number of the secondary particles, and wherein the secondary particle of the active material is present in a portion of the first active material layer, the portion being different from the interfacial portion.

2. The all solid-state battery according to claim 1, wherein the second active material layer has an opposing part that is opposite to the first active material layer across the solid electrolyte layer, when a cross section of the second active material layer is observed, a second active material that is included in the opposing part is constituted of the primary particle, and the relation of $0<(X2/Y)\leq0.03$ is satisfied wherein X2 is a diameter of the primary particle of the second active material ($\mu$m) and Y is the thickness of the solid electrolyte layer.

* * * * *